United States Patent [19]

Burenga

[11] Patent Number: 5,509,770

[45] Date of Patent: Apr. 23, 1996

[54] HAY HANDLER AND UNROLLER APPARATUS WITH IMPROVED CLAMP ARM AND BRACKET DESIGN

[75] Inventor: Thomas I. Burenga, Litchfield, Ill.

[73] Assignee: Worksaver, Inc., Litchfield, Ill.

[21] Appl. No.: 383,308

[22] Filed: Feb. 3, 1995

[51] Int. Cl.⁶ ........................................ B66F 9/18
[52] U.S. Cl. ................. 414/24.6; 242/557; 242/596.3; 294/106
[58] Field of Search ............................ 294/106; 414/24.5, 414/24.6; 242/557, 596.3

[56] References Cited

U.S. PATENT DOCUMENTS

| | | | |
|---|---|---|---|
| 3,946,887 | 3/1976 | Parker | 414/24.6 X |
| 4,049,140 | 9/1977 | Roose | 414/24.6 X |
| 4,095,706 | 6/1978 | Schwien et al. | 414/24.6 |
| 4,722,651 | 2/1988 | Antal | 414/24.6 X |

OTHER PUBLICATIONS

Owner's Manual, Model Nos. HHU-1550 and HHUN-1548, Hay Handler/Unroller made by Worksaver, Inc., Litchfield, IL, Jul. 1991.

Worksaver Bale Handling Equipment made by Worksaver, Inc., Litchfield, IL.

Primary Examiner—Michael S. Huppert
Assistant Examiner—Janice L. Krizek
Attorney, Agent, or Firm—Paul M. Denk

[57] ABSTRACT

An improved clamp arm and bracket design for a hay handler and unroller apparatus which accommodates a wide range of varying lengths of hay bales is disclosed. The improved clamp arm includes an improved bracket design which is connected to a frame which in turn is connected to a tractor via a three point hitch. Each bracket can be mounted to the frame in one of two possible positions where the bracket is rotated 180° from a first position where the bracket extends inwardly to obtain a second position where the brackets extend outwardly. These alternate positions enable the apparatus to provide for varying distances between said clamp arms by allowing for three possible arrangements of the brackets, namely, both brackets in the first position to accommodate shorter bales, both brackets in the second position to accommodate longer bales, and one bracket in the first position and the other bracket in the second position to accommodate bales of an intermediate length.

13 Claims, 2 Drawing Sheets

HAY HANDLER AND UNROLLER APPARATUS WITH IMPROVED CLAMP ARM AND BRACKET DESIGN

BACKGROUND OF THE APPLICATION

This invention relates to a hay handler and unroller apparatus, and in particular pertains to improvements in the clamp arm and bracket design of a hay handler and unroller apparatus which enables the apparatus to handle a wide range of large round hay bale lengths.

Hay handlers and unrollers typically include a frame which is mounted to a tractor, normally by means of a three point hitch. Generally, a hay handler and unroller apparatus also includes a pair of clamp arms that are attached to the frame by means of a bracket which are used to hold the bale of hay in place. Securing devices are often attached at the outermost end of the clamp arms which pierce the hay bales to further secure the placement of the bale within the apparatus. For example, see the hay handler and unrollers produced by Worksaver, Inc., model numbers HHU-1550 and HHUN-1548. However, the prior art design of hay handlers and unrollers are only able to handle hay bales within a limited range of lengths. The brackets used in the prior art are attached in only one position to a frame and the distance between the clamp arms cannot be increased or decreased by a substantial amount to accommodate for bales of hay of differing lengths unless additional parts are used. Therefore, users/customers typically stock multiple separate hay handlers where each hay handler accommodates bales of hay of different specified lengths. Furthermore, since multiple units must be constructed, manufacturers are required to have an increased inventory with additional parts in stock to produce hay handlers of various sizes.

SUMMARY OF THE INVENTION

One object of the present invention is to provide an improved clamp arm design for hay holder and unroller which is capable of transporting and unrolling a wide range of hay bales of varying lengths.

Another object of this invention is to provide standardized parts for a hay handler and unroller such that it will accommodate hay bales of varying lengths without requiring additional parts to satisfy varied customer requirements.

Another object of this invention is to provide a reversible clamp arm and bracket which can be attached to a frame in two possible positions which allows for three (four) possible configurations of the hay handler and unroller apparatus where the same parts are used to assemble each configuration.

Still another object of this invention is to provide dual position brackets such that the hay handler and unroller is able to accommodate a bale of hay of varying lengths depending upon whether both brackets are maintained in a first position such that both brackets extend inwardly facing each other or whether both brackets are maintained in a second position such that the brackets are turned over or rotated 180° from the first position so as to extend in an outwardly manner or whether one bracket is maintained in the first position and the other bracket is maintained in the second position.

These and other objects will become apparent to those skilled in the art in light of the following disclosure and accompanying drawings.

In accordance with the invention, generally stated, an improved clamping device for use in a hay handler and/or unroller apparatus is disclosed for transporting and unrolling hay bales which have generally cylindrical shapes of varying lengths and diameters (circumferences).

BRIEF DESCRIPTION OF THE DRAWINGS

The objects of the invention are achieved as set forth in the illustrative embodiments shown in the drawings which form a part of the specification.

DESCRIPTION OF THE PREFERRED EMBODIMENT

Figure 1:
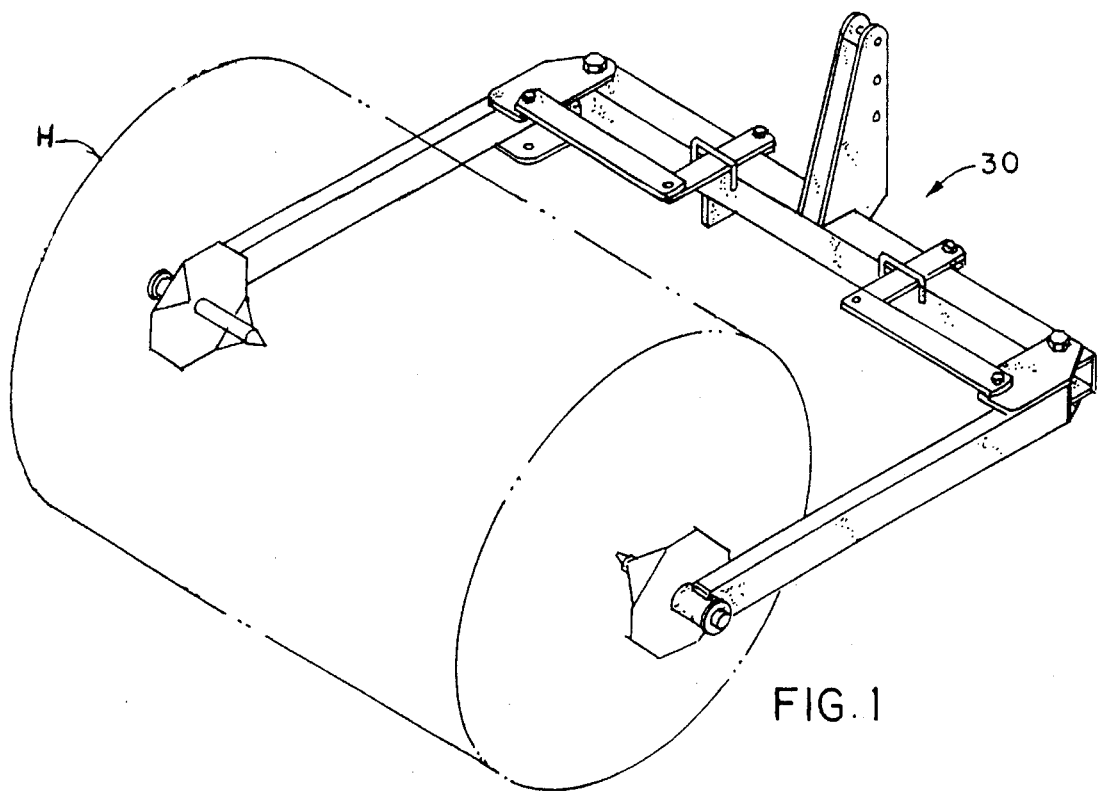
FIG. 1 provides an isometric view of the hay handler and unroller of the present invention.
Figure 2:
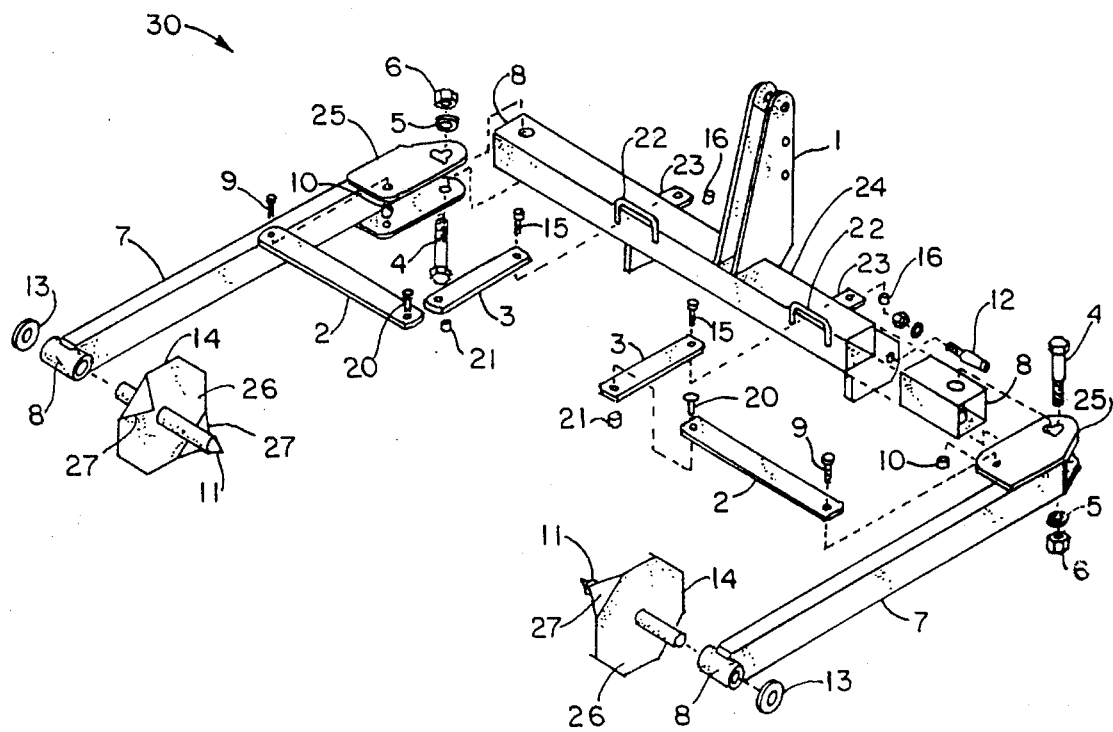
FIG. 2 provides an exploded view of the hay handler and unroller of the present invention.

Referring generally to the drawings, and in particular to FIGS. 1 and 2, a hay handler and unroller 30 is disclosed. The hay handler and unroller 30 includes a frame 24 which is secured by means of a mount 1 to a three point hitch of a tractor, or the like. The hay handler and unroller 30 is used for transporting and unrolling hay bales H of varying lengths. A pair of clamp arms 7 are attached to the frame 24 by means of a pair of brackets 25. To attach the bracket 25 to the frame 24, a bolt 4 is inserted through an opening in a top surface of the bracket 25, then through an opening in the end of frame 24, and then through a corresponding opening in the bottom side of the bracket 25, as shown in FIG. 2. The bolt 4 is secured by a washer 5 and a nut 6. The bracket 25 is attached in such a manner to allow for limited pivotal movement of the bracket about bolt 4.

To restrict the movement of the clamp arm 7 and bracket 25, a positioning device is attached between the bracket 7 and frame 24. The positioning device includes a push arm 2 that is attached to the bracket 25 by means of a nut 9 and a bolt 10 as shown in FIG. 2. The positioning device also includes a cylinder pivot arm 3 which is connected to the opposite end of the push arm 2 by means of a bolt 20 and a nut 21, allowing for pivotal movement of the pivot arm 3 with respect to the push arm 2. The opposite end of the pivot arm 3 is inserted through a "U" shaped bracket 22 which is attached to the frame 24. This end of the pivot arm 3 is then attached to a tab 23 which extends rearwardly from the frame 24 by means of a bolt 15 and a nut 16, allowing for limited pivotal movement of the pivot arm 3 with respect to the tab 23 and frame 24. To further control the movement of the clamp arms 7 inwardly and outwardly, a hydraulic or other motivational means may be located between the frame 24 and each clamp arm 7 or connected through the three point hitch extending from a tractor to each clamp arm 7.

Figure 3A:
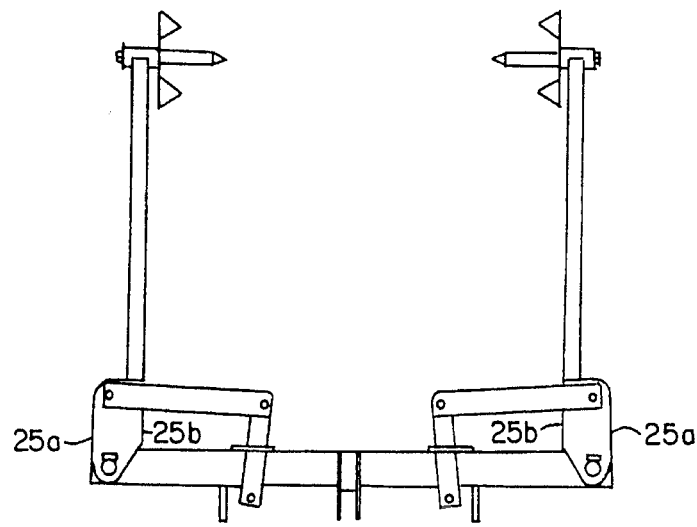
FIG. 3A provides a top view of the hay handler and unroller of the present invention when ifs brackets are maintained in a first position.
Figure 3B:
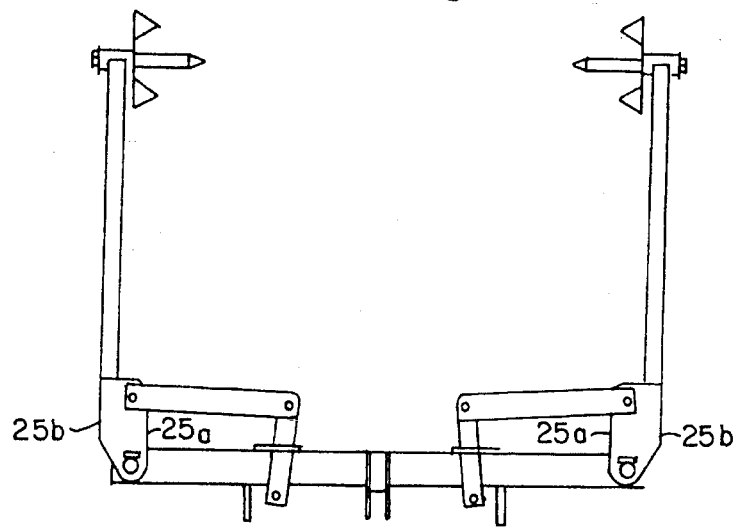
FIG. 3B provides a top view of the hay handler and unroller of the present invention when its brackets are maintained in a second position.

The clamp arms 7 are reversible in that they can be turned or "flipped over" or rotated 180° to provide for three possible ways to assembly the clamp arms 7 and brackets 25 to the frame 24. The clamp arms are designed with an offset, preferably a 3 inch offset. Therefore, by flipping both arms over, the distance between the clamp arms 7 changes by approximately 12 inches. If only one clamp arm is reversed, the distance between the clamp arms 7 changes by approximately 6 inches. As shown in FIGS. 3A and 3B, brackets 25 have long side 25a and a short side 25b. Two openings are present in the bracket 25 near the forward and rear ends of the long side 25a. As discussed above in relation to FIG. 2, bolt 9 is inserted through the forward opening to attach the push arm 2 to the bracket 25. Furthermore, bolt 4 is inserted through the rear opening to attach the bracket 25 to the frame 24. The clamp arms 7 are attached along the short side 25b as shown in FIGS. 3A and 3B.

Figure 3C:
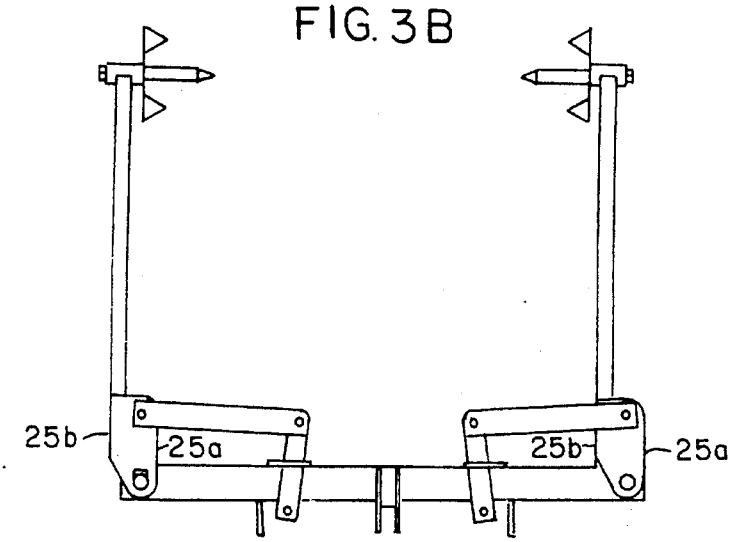
FIG. 3C provides a top view of the hay handler and unroller of the present invention when its brackets are maintained in a third position.

FIG. 3A illustrates one possible configuration of the hay handler and unroller 30 where the brackets 25 are maintained in a first position. In this embodiment, the brackets 25 are facing inwardly such that the short side 25b and the clamp arm 7 face inwardly and the long side 25a of bracket 25 faces outwardly. This assembly allows the hay handler and unroller 30 to transport and unroll shorter bales of hay H, for example, bales ranging in length from 40 inches to 62 inches. In FIG. 3B, a second possible configuration is depicted where the brackets 25 are maintained in a second position. The brackets 25 are flipped over or rotated 180° so that they face outwardly, i.e., the short side 25b and clamp arm 7 face outwardly and the long side 25a of the bracket faces inwardly. This embodiment enables the hay handler and unroller 30 to accommodate larger bales of hay H than that shown in FIG. 3A, for example, bales ranging in length from 54 inches to 72 inches. FIG. 3C illustrates a third possible embodiment of the hay handler and unroller 30 where the brackets 25 are maintained in a third position which is an intermediate position between the first position (FIG. 3A) and the second position (FIG. 3B). In this arrangement, one bracket is facing inwardly such that the short side 25b of bracket 25 faces inwardly and the other bracket 25 is facing outwardly such that the short side 25b faces outwardly. When assembled in this manner, the hay handler and unroller 30 accommodates bales of hay H of an intermediate length, for example, bales ranging in length from 45 inches to 68 inches. Therefore, as shown in FIGS. 3A, 3B and 3C, the hay handler and unroller 30 can transport and unroll a wide range of hay bales H of varying lengths without requiring additional parts to assemble different possible embodiments.

A pair of securing devices are attached at the forwardmost or frontal ends of the clamp arms 7 to secure the bale of hay H between the clamp arms 7. Each securing device includes a substantially flat disc with two integrally formed triangular flanges 27 extending inwardly from the disc 26 that provide added support by piercing the bale of hay H. A pointed spike 11 extends inwardly through the disc 26 such that the point of the spike pierces the bale of hay H to provide further assistance in securing the bale of hay H, regardless of the position of the brackets 25. The back dull end of the spike extends outwardly from the disc 26 and is inserted through a tubular collar or zerk which is mounted to the forwardmost end of each clamp arm 7. To further secure the securing device to the clamp arm 7, the back end of the spike 11 is then inserted through a washer 13.

The foregoing description is set forth for illustrative purposes only and is not meant to be limiting. Numerous variations, within the scope of the appended claims will be apparent to those skilled in the art in light of the foregoing description and accompanying drawings.

I claim:

1. A clamping means for use in a hay handler and unroller apparatus for transporting and unrolling hay bales having generally cylindrical or rectangular shapes with varying lengths and diameters, the length of the bales being between a maximum length and a minimum length, said clamping means being connectable by a frame having a first end and a second end to a three point hitch to a tractor, said clamping means being attached at each end of said frame and extending forwardly therefrom so as to define an opening/cavity in which said hay bale is contained, said clamping means including:

a pair of brackets attached to each end of said frame, allowing for limited pivotal movement of said brackets about said frame, each bracket being disposed in either a first position or a second position depending upon the length of the bale of hay to be handled, said second position enabling said apparatus to handle a longer bale of hay then when said bracket is maintained in said first position;

a pair of clamp arms, each clamp arm having a first end attached to said bracket and forwardly extending from said bracket and said frame, said clamp arms being disposed in a substantially perpendicular direction with respect to said frame;

a pair of positioning means allowing for limited pivotal movement of said clamp arms and said brackets to accommodate varying lengths of hay bales, each positioning means including a pivot arm having a first end and a second end and a push arm having a first end and a second end, said first end of said push arm being connected to said bracket, said second end of said push arm connected to said first end of said pivot arm allowing for pivotal movement of said pivot arm with respect to said push arm, said second end of said pivot arm being connected to said frame allowing for pivotal movement of said pivot arm with respect to said frame; and a pair of securing means provided for ensuring said hay bale is tightly secured between said arms, said securing means being mounted to the second end of each clamp arm and extending inwardly towards each other.

2. The clamping means of claim 1 wherein the brackets extend inwardly into said cavity in said first position, said bracket being turned to obtain said second position such that said bracket is arranged outwardly from said cavity in said second position.

3. The clamping means of claim 2 wherein said brackets are turned 180°.

4. The clamping means of claim 3 wherein both brackets are maintained in said second position to provide a maximum distance between said arms to accommodate a longer bale of hay.

5. The clamping means of claim 3 wherein said brackets are maintained in said first position to provide a minimum distance between said arms to accommodate a shorter bale of hay.

6. The clamping means of claim 3 wherein one bracket is maintained in said first position and the other bracket is maintained in said second position to obtain an intermediate distance between said clamp arms which is shorter than said maximum length and longer than said minimum length for a bale of hay.

7. The clamping means of claim 2 wherein each securing means includes a disc positioned parallel to an inner surface of said second end of said clamp arm, said disc integrally having a pair of flanges spaced apart at opposite sides of said disc and extending inwardly from said disc into said cavity to secure the bale of hay between said clamp arms, and a spike perpendicularly positioned in relation to said disc having a pointed end extending inwardly for piercing said hay bale and a back end extending outwardly from said cavity and through said disc.

8. The clamping means of claim 7 wherein a tubular collar is mounted to said second end of said clamp arm, said back end of said spike being inserted through said collar to connect said securing means to said clamp arm, said back end of said spike also being inserted through a washer to further secure said securing means to said clamp arm.

9. The clamping means of claim 2 wherein said pivot arms are attached to said frame by inserting each pivot arm through a "U" shaped bracket attached to said frame, and connecting said pivot arm to a tab extending from said frame, allowing for a pivotal movement of said pivot arm with respect to said tab.

10. The clamping means of claim 9 wherein said pivot arm includes an opening in its second end through which a bolt is inserted, said bolt being inserted through an opening in said tab, and a nut fastening onto said bolt to secure the pivot arm.

11. The clamping means of claim 10 wherein said pivot arm includes an opening in its first end through which a bolt is inserted, said bolt being inserted through an opening in said push arm and receiving a nut.

12. The clamping means of claim 11 wherein said push arm further includes an opening in its first end through which a bolt is inserted, said bolt then being inserted through an opening in said bracket, said bolt receiving a nut.

13. The clamping means of claim 12 wherein said bracket includes a second opening through which a bolt is inserted, said bolt being inserted through a top side of said bracket and then through an opening in said frame and then through a bottom side of said bracket, said bolt then being inserted through a washer and then further secured by a nut.

* * * * *